Figure 4:
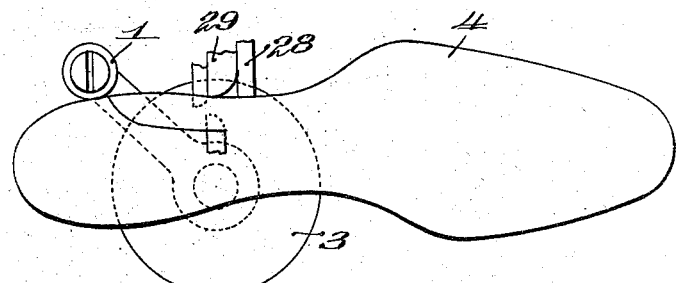

E. E. WINKLEY.
AUTOMATIC SOLE MACHINE.
APPLICATION FILED APR. 2, 1906. RENEWED NOV. 11, 1910.
1,041,215.
Patented Oct. 15, 1912.
2 SHEETS—SHEET 1.
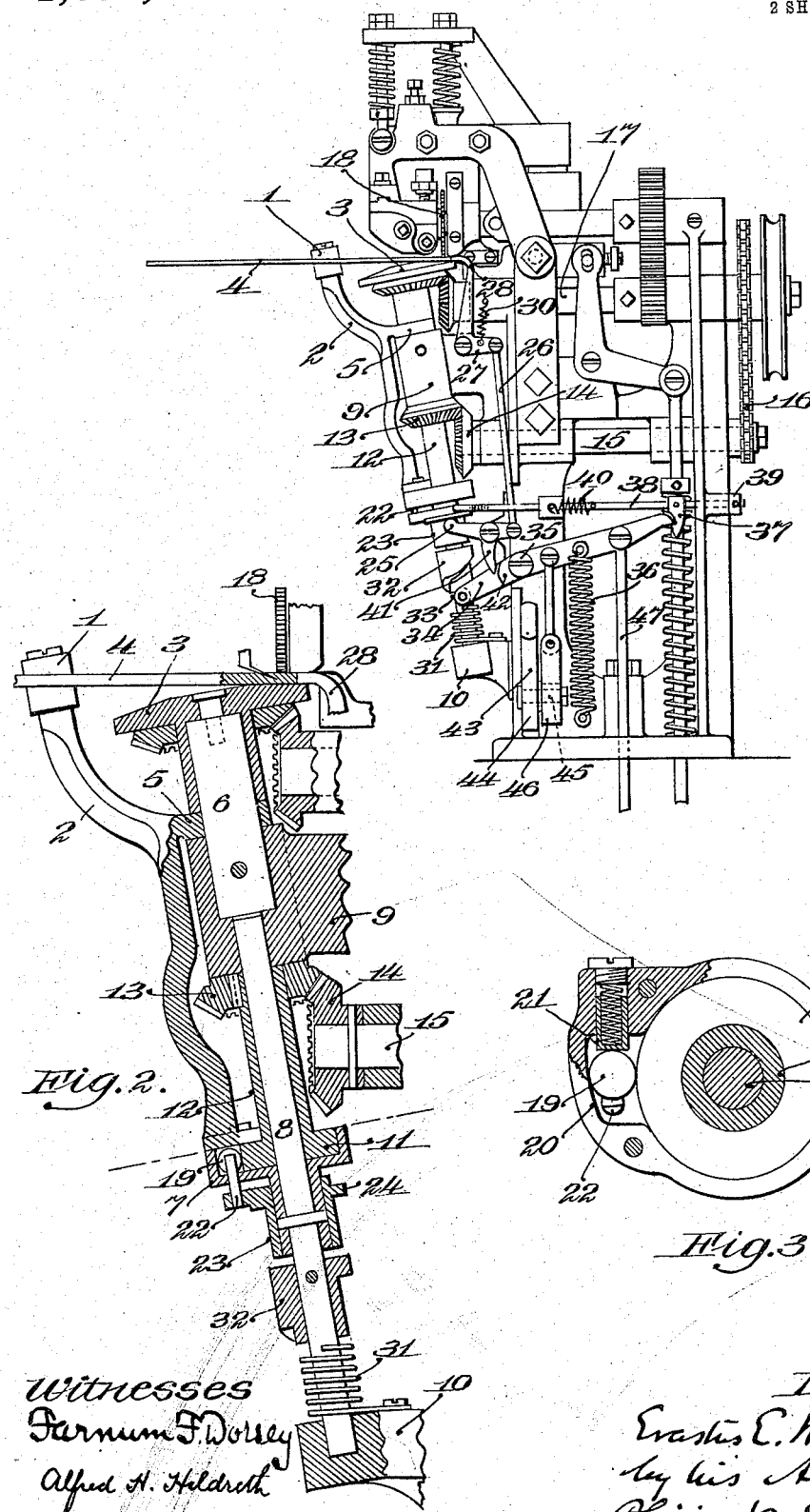

E. E. WINKLEY.
AUTOMATIC SOLE MACHINE.
APPLICATION FILED APR. 2, 1906. RENEWED NOV. 11, 1910.

1,041,215.

Patented Oct. 15, 1912.
2 SHEETS—SHEET 2.

UNITED STATES PATENT OFFICE.

ERASTUS E. WINKLEY, OF LYNN, MASSACHUSETTS.

AUTOMATIC SOLE-MACHINE.

1,041,215.  Specification of Letters Patent.  Patented Oct. 15, 1912.

Application filed April 2, 1906, Serial No. 309,401. Renewed November 11, 1910. Serial No. 591,796.

*To all whom it may concern:*

Be it known that I, ERASTUS E. WINKLEY, a citizen of the United States, residing at Lynn, in the county of Essex and State of Massachusetts, have invented certain new and useful Improvements in Automatic Sole-Machines; and I do hereby declare the following to be a full, clear, and exact description of the invention, such as will enable others skilled in the art to which it appertains to make and use the same.

The invention relates to controlling or correcting mechanism which is adapted to correct the angular relation between the work and tool or between the work and feed mechanism, of machines in which the tool operates progressively along the work. The term "tool" is used to designate any instrument or combination of instrumentalities for operating on the work. Machines of this character are extensively used in the manufacture of boots and shoes for performing various operations upon the shoe soles or other parts connected or to be connected therewith. Many of these machines are provided with feeding means constructed to cause a relative movement of the tool and work in the general direction of the periphery of a shoe sole, and the prescribed travel of the tool along the work is secured by relatively swinging the tool and work to correct their angular relation in accordance with the curvature of the sole, the relative swinging movements being usually effected by the operator, who swings or tips the work as the feed progresses to maintain the edge of the sole or some marginal channel or abutment thereon in engagement with a suitable gage. The periphery of the sole or the marginal abutment with which the gage contacts constitutes a form or pattern for determining the path of travel of the tool along the work.

It is one of the objects of the present invention to provide novel and improved mechanism for automatically correcting the angular relation of the work and tool to maintain the tool in proper angular relation to the edge or surface of the work or to the line of feed as its point of operation progresses along the work.

It is a further object of the invention to provide mechanism for controlling the corrective swinging movements by the contour of a form which corresponds to the path of travel of the tool along the work.

With these objects in view, one feature of the invention contemplates the provision in a machine provided with feeding means for effecting a relative travel of the tool along the work in the direction of the periphery of a form, which may be a contour of the work, of mechanism controlled by the contour of the form for relatively swinging the feeding means and work to cause the path of travel of the tool along the work to correspond to the contour of the controlling form. Broadly considered, the form may be the periphery or other contour of the article to be operated upon, or may be a separate pattern, and the relative feeding movement and the relative swinging movement may be caused by movement of either the feeding means or of the form and work.

The broader features of the invention also contemplate the use of any suitable mechanism for controlling the relative swinging or angular movements of the work and feeding means or of the work and tool by the contour of the form. It is preferred, however, to control these movements by a feeler arranged to travel along a contour on the work and by its position to determine the corrective movements requisite for causing the path of travel of the tool along the work to conform to the outline of the contour, or for maintaining the tool in proper angular relation to the work.

The various features of the invention will be readily understood from an inspection of the accompanying drawings and the following detailed description of the machine illustrated therein.

Figure 5:
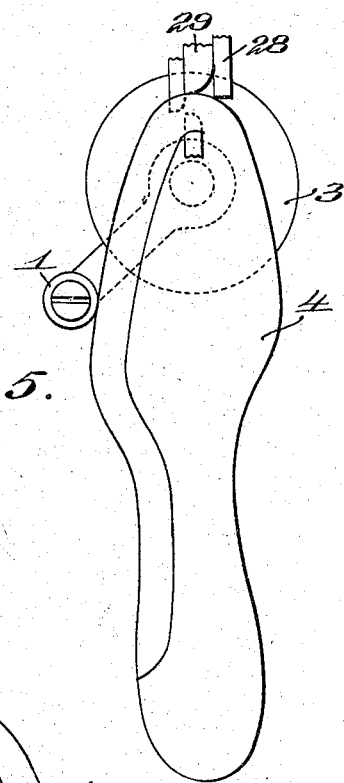
Figure 6:
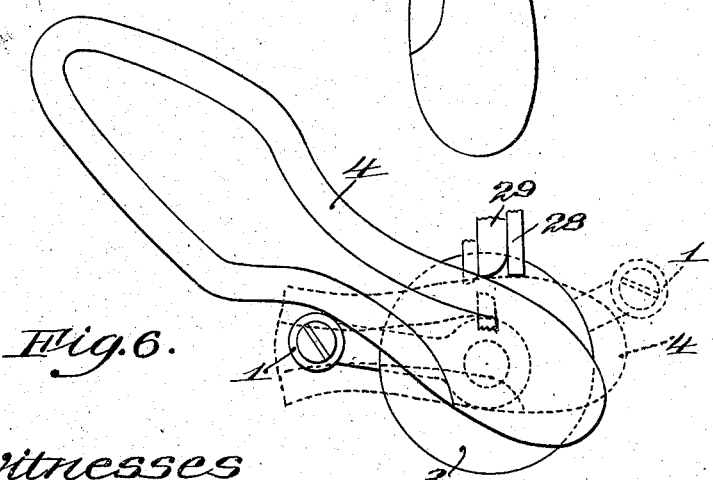

In the drawings Figure 1 is a side elevation of an insole-channeling and slitting machine embodying the present invention. Fig. 2 is a vertical section through the work support and the automatic guiding mechanism. Fig. 3 is a detail plan view, partly in section, showing the construction of the clutch; and Figs. 4, 5 and 6 are diagrammatic plans showing the manner in which the guide acts upon the sole blank.

In the drawings the invention is illustrated as embodied in a channeling machine of familiar form by the addition thereto of automatic mechanism for guiding the blank. The channeling machine shown is, in its general construction and mode of operation, the well-known Goodyear channeling machine such as is shown in the patent to Beckman, No. 644,571, and need not be particularly described except in so far as relates to the automatic mechanism. The machine is provided with channeling and edge-slitting knives yieldingly mounted in a head, and with a rotating feed wheel and a rotating work support by which the work is held and fed against the knives. The machine is provided also with an edge gage to determine the distance of the cuts produced by the knives from the edge of the insole. The machine is also provided with mechanism for automatically swinging the blank to correct its position with relation to the knives, and to maintain its edge in the line of feed during the transfer of the point of operation of the knife about the sole. In the construction shown, this means comprises a guide roll 1 which is arranged to engage the edge of the blank and is operated to properly swing the blank whenever its edge tends to recede from the edge gage. The roll is journaled on an arm 2 which is pivotally mounted concentrically with the axis of the work support 3 upon which the blank 4 rests, and automatic mechanism is arranged to swing the guide roll 1 about the axis of the work support so as to swing the blank. The arm 2 is supported at 5 by a collar journaled on the stud 6 upon which the work support is mounted to turn, and at its lower end it is fixed to the outer member 7 of a clutch by which the arm is actuated at suitable times. The clutch member 7 is also fixed to a shaft 8 which is journaled at its upper end in the bracket 9 on the frame of the machine on which the stud 6 is mounted, and at its lower end in a bracket 10. The inner member 11 of the clutch comprises a disk journaled on the shaft 8 and connected by a sleeve 12 with a bevel gear 13. The gear 13 is connected by a gear 14, shaft 15, and sprocket chain 16, with the driving shaft 17 by which the instrumentalities of the channeling machine are actuated. The work support 3 and feed wheel 18 are driven from the shaft 17 in the usual manner. The outer and inner members 7 and 11 of the clutch are connected and disconnected by means of a ball 19 carried in a recess in the clutch member 7. The recess has a wall 20 inclined to the adjacent surface of the clutch member 11, so that under the influence of a spring plunger 21 the ball tends to pinch between the clutch members and cause them to rotate together. The clutch is held normally out of operation, however, by means of a pin 22 having a beveled upper end which bears against the ball 19 opposite to the plunger 21. The pin 22 passes through a hole in the bottom of the clutch member 7 and is fixed in an arm on a sleeve 23 loosely mounted concentrically with the shaft 8 and free to rise and fall. When the sleeve 23 and pin 22 are raised the inclined surface of the pin thrusts the ball back out of operative engagement between the clutch members. The sleeve 23 is provided with a flange 24 engaged by a lever 25 pivoted on the frame of the machine. The lever 25 is connected by a link 26 with a bell-crank lever 27 pivoted on the frame of the machine. The lever 27 is formed at its upper extremity as a feeler 28 which engages the edge of the insole blank at one side of the edge gage 29. A spring 30 connected with the lever 27 tends to move the feeler forward and to raise the link 26 so as to permit the pin 22 to fall and the ball 19 to operatively connect the clutch members. A spring 31 is connected with the lower end of the shaft 8 and with the frame of the machine, and tends constantly to rotate the shaft 8 and arm 2 so as to press the guide roll 1 lightly against the edge of the sole blank. During the operation of the machine, so long as the work is properly presented to the knives as it is fed, the feeler is held back in the position of Fig. 4 by its engagement with the edge of the blank; but if at any time, as, for example, where a sharp curvature is encountered in the blank, the blank, owing to its curvature at the point of operation, tends to recede from the edge gage, the feeler moves forward under the influence of the spring 30 so as to remain in contact with the edge, and by this movement the clutch is thrown into operation and the guide is swung about the work support until the sole blank has been swung into proper position with relation to the knives, this operation being automatically discontinued as soon as the feeler is pushed back again by the edge of the blank.

The blank is automatically ejected at the completion of the operation thereon, and the machine put into condition to receive a new blank, by automatic mechanism operating in connection with the guide. The shaft 8 is provided with a helical cam 32 in position to be engaged by a cam roll 33 on a lever 34 pivoted at 35 on the frame of the machine. A tension spring 36 tends constantly to swing the lever 34 so as to cause the cam roll 33 to engage and rotate the cam 32 and the parts connected therewith, but during the operation of the machine on a blank the lever 34 is held in the position of Fig. 1 by a detent 37 which engages the rear end of the lever. The detent is mounted on a rod 38 slidingly mounted in bearings on the frame of the machine and normally held in the position shown by a stop collar 39 and a spring 40. During the operation on a blank, after the operation has proceeded around the forepart and has been almost completed at the heel end of the shank the guide roll 1 swings clear of the heel of the blank, as shown in dotted lines, Fig. 6. This movement causes the arm carrying the pin 22 to strike the forward end of the slide rod 38 and push the rod and the detent 37 back so as to release the lever 34. The lever is at once drawn down by the spring 36, and the cam roll 33, acting on the cam 32, causes the guide roll to be swung back until it engages the outer edge of the blank, as shown in Fig. 6, whereby the blank is swung so as to cause the knives to cut out to the edge of the blank, and the continued movement of the guide roll then ejects the blank. To prevent the clutch from interfering with this return movement of the guide roll and from acting while there is no work in the machine, the lever 25 is provided with a depending arm 41 engaging a cam surface 42 on the lever 34. The cam roll 33 is normally a short distance below the cam 32, and during the first movement of the lever 34 the cam 42, acting on the arm 41 swings the lever 25 so as to throw out the clutch and hold it out regardless of the position of the feeler.

In order that the machine, after ejecting a blank, may be in position to receive another, automatic means are provided for raising the knives and the feed wheel. The machine is provided with the usual means for raising these parts to insert the work, including the usual hand lever 43, pivoted at 44, but a pin 45 fixed in the hand lever is engaged by a link 46 connected with the lever 34. The link is slotted as shown in dotted lines, so as to move freely over the pin 45 during the first movement of the lever 34, but during the last part of such movement, after the blank has been swung away from the knives, the link 46 acts to depress the hand lever and raise the operating instrumentalities. The lever 34 is connected by a link 47 with a treadle, (not shown) by which it may be raised after a blank has been inserted, to allow the operating instrumentalities to engage the work and to restore the lever 34 to the position of Fig. 1 so as to release the guiding mechanism.

The operation in general of the machine is as follows:—The operator inserts a blank in the position of Fig. 4, the guide roll occupying the position shown in the figure, and then depresses the treadle, permitting the knives and feed wheel to engage the blank. The machine then operates automatically, swinging the blank at the angles between the shank and the forepart and at the tip of the toe by means of the automatic mechanism above described. After the channeling operation has proceeded entirely around the forepart and to the heel part on the opposite side to that on which it is started, the guide roll is automatically swung back until it encounters the outer edge of the blank as shown in Fig. 6, and by its pressure thereagainst it swings the blank so as to cause the knives to cut outward to the edge and complete their operation, the blank being discharged from the machine by this operation. The machine is then ready to receive a new blank, the knives and feed wheel being raised.

By means of the automatic guiding mechanism above described the operator is relieved from the necessity of attending to the machine during the course of its operation upon a blank, his services being required only in inserting a fresh blank, and therefore one operator may feed two or more machines. Since the work is guided automatically, the accuracy with which it is operated upon does not depend upon the care and skill of an operator but is uniform.

Although the invention has been described in connection with a channeling machine of a particular form, it will be understood that it is applicable to machines of many kinds for operating upon soles or insoles, and may be used, in addition to machines of the character already referred to, in machines for reinforcing insoles or in fact for performing any operation upon the marginal portion of a sole or insole in which it is necessary to guide the work as it is fed.

The invention is not, in general, limited to the details of construction and operation above described, but may be embodied in other forms broadly defined by the claims.

Having now described the invention, what is claimed is:—

1. An automatic sole machine, having, in combination instrumentalities engaging the marginal portion of a sole blank and including means for feeding, and operating upon the blank, and guiding means acting automatically at suitable intervals to swing the blank when certain portions thereof are reached in the operation thereon, substantially as described.

2. An automatic sole machine, having, in combination, instrumentalities engaging the marginal portion of a sole blank and including means for feeding, and operating upon the blank, the blank being normally free to swing under the influence of such means, and guiding means acting automatically at suitable intervals, when certain points on the blank are reached, to control the swinging movement thereof, substantially as described.

3. An automatic sole machine, having, in combination, instrumentalities including an edge gage and means for feeding a sole blank tending normally to hold the blank against the edge gage, and guiding means thrown into operation and acting automatically to swing the blank when a sharply curved portion is reached, substantially as described.

4. An automatic sole machine, having, in combination, instrumentalities engaging the marginal portion of a sole blank, including an edge gage and feeding means tending to swing the blank against the edge gage, the blank being normally free to swing under the influence of the feeding means, and guiding means thrown into operation and acting automatically, when certain points on the blank are reached, to control the swinging movement of the blank, substantially as described.

5. An automatic sole machine, having, in combination, means for feeding and operating upon a sole blank, a movable guide engaging the marginal portion of the blank, and mechanism acting automatically during the operation on the blank to move the guide and swing the blank, substantially as described.

6. An automatic sole machine, having, in combination, means for feeding and operating upon a sole blank, a movable guide roll arranged to engage the edge of the blank, and mechanism acting automatically during the operation on the blank to move the guide roll and swing the blank, substantially as described.

7. An automatic sole machine, having, in combination, instrumentalities including means for feeding, guiding and operating upon a sole blank, automatic mechanism for controlling the operation of said instrumentalities, and a feeler engaging the marginal portion of the blank so as to be controlled in its movements in accordance with the contour thereof, the feeler being connected with the said automatic mechanism so as to control its time of operation, substantially as described.

8. An automatic sole machine, having, in combination, instrumentalities including means for feeding, guiding and operating upon a sole blank, a feeler engaging the edge of the blank in advance of the operating means, and automatic mechanism controlled by the feeler, for controlling the operations of said instrumentalities, substantially as described.

9. An automatic sole machine, having, in combination, instrumentalities engaging the marginal portion of a sole blank and including means for feeding, guiding, and operating on the blank, movable guiding means for swinging the blank, mechanism normally inoperative for actuating said guiding means, and a feeler connected with said mechanism and engaging the edge of the blank in advance of the operating means, the feeler acting, when the edge of the sole tends to move away from it, to throw said mechanism in operation to actuate the movable guiding means and swing the blank into proper position, substantially as described.

10. An automatic sole machine, having, in combination, instrumentalities engaging the marginal portion of a sole blank for feeding and operating on the blank, an edge gage, a movable guide for changing the position of the margin of the blank relatively to the edge gage, mechanism for actuating the guide, and a feeler connected with said mechanism and engaging the edge of the blank adjacent to the edge gage, the feeler operating to control the operation of the mechanism in accordance with the position of the edge of the blank with relation to the edge gage, substantially as described.

11. An automatic sole machine, having, in combination, means for feeding and operating on a sole blank, guiding means for controlling the movements of the blanks, a feeler engaging the marginal portion of the blank in advance of the operating means, and automatic mechanism controlled by the feeler for actuating the said guiding means, substantially as described.

12. An automatic sole machine, having, in combination, means for feeding and operating on a sole blank, a guide engaging the edge of the blank in the rear of the operating means, a feeler engaging the edge of the blank in advance of the operating means, and automatic mechanism controlled by the feeler for moving the guide to swing the blank at suitable times in the operation thereon, substantially as described.

13. An automatic sole machine, having, in combination, instrumentalities for acting upon a sole blank, automatic mechanism, normally inactive, for actuating said instrumentalities, and means controlled by a feeler engaging the blank for throwing said automatic mechanism intermittently into operation, substantially as described.

14. An automatic sole machine, having, in combination, a rotary work support, means for feeding and operating on a sole blank on the work support, a guide for swinging the sole blank arranged to swing about the axis of the work support, and mechanism for actuating the guide, substantially as described.

15. An automatic sole machine, having, in combination, means for feeding and operating on a sole blank, a movable guide for swinging the blank, mechanism for actuating the guide including a clutch normally inoperative, and a feeler engaging the blank and connected with the clutch to throw the latter into operation when the feeler moves to a predetermined position, substantially as described.

16. An automatic sole machine, having, in combination, means for operating upon the marginal portion of a sole blank, a work support for the blank, and means independent of the work support for feeding and guiding the sole blank acting automatically at intervals to swing the blank in conformity with the curvature of its margin, substantially as described.

17. An automatic sole machine, having, in combination, means for operating upon the marginal portion of a sole blank, means for feeding the blank, means for automatically swinging the blank, and means engaging the margin of the blank for controlling the operation of the blank swinging means.

18. An automatic sole machine, having, in combination, instrumentalities engaging the marginal portion of a sole blank and including means for feeding and operating upon the blank, and means acting independently of the feed to swing the blank, substantially as described.

19. An automatic sole machine, having, in combination, means for operating upon the marginal portion of a sole blank, means for feeding the blank, and automatic means controlled by the curvature of the margin of the blank acting independently of the feed to swing the blank in conformity with said curvature, substantially as described.

20. An automatic sole machine, having, in combination, means for operating upon the marginal portion of a sole blank, means for feeding the blank, a movable feeler engaging the edge of the blank, and means coöperating with the feeler to swing the blank.

21. An automatic sole machine, having, in combination, means for operating upon the marginal portion of a sole blank, means for feeding the blank, a feeler engaging the edge of the blank, and means operating upon a change in the position of the feeler to swing the blank.

22. An automatic sole machine, having, in combination, means for feeding and operating upon a sole blank, a movable guide engaging the marginal portion of the blank and means controlled by the curvature of the margin of the blank for swinging the blank.

23. An automatic machine, having, in combination, a tool, feeding means for causing a relative travel of the tool along the work in the direction of the periphery of a form, and mechanism other than the form and controlled by the curvature of the form for relatively swinging the feeding means and work to cause the path of travel of the tool along the work to correspond to the contour of the form, substantially as described.

24. An automatic machine, having, in combination, feeding means for causing a relative movement between said means and a form in the direction of the periphery of the form, and mechanism other than the form and controlled by the curvature of the form for relatively swinging the work and feeding means in accordance with the contour of the form, substantially as described.

25. An automatic machine, having, in combination, a tool, means for causing a relative movement of the tool and work in the direction of the periphery of a form, mechanism other than the form for modifying said movement, and means arranged to engage the periphery of the form for controlling the action of said modifying mechanism, substantially as described.

26. An automatic machine, having, in combination, a tool, means for moving the work to transfer the point of operation of the tool along the work in the direction of the periphery of a form, and mechanism other than the form and controlled by the curvature of the form for correcting the angular relation between the tool and work as the point of operation progresses along the work, substantially as described.

27. An automatic machine, having, in combination, a tool, feeding means for relatively moving the tool and work to transfer the point of operation of the tool along the work in the direction of the periphery of a form, and mechanism other than the form and controlled by the periphery of the form for causing the path of travel of the tool to correspond to the contour of the form, substantially as described.

28. An automatic machine, having, in combination, a tool, feeding means acting to transfer the point of operation of the tool along the work in the direction of the periphery of a form, and mechanism other than the form and controlled by the curvature of the form acting to automatically swing the work in accordance with the curvature of the form, substantially as described.

29. A feeding mechanism for automatic machines, having, in combination, a gage arranged to engage the periphery of a form, a feeler arranged to engage the form, feeding means for causing a relative travel of the gage and feeler along the periphery of the form, and mechanism controlled by the feeler for relatively swinging the feeding means and form to keep the gage and form in contact, substantially as described.

30. An automatic machine, having, in combination, means for operating on the work, means for feeding the work to transfer the point of operation of the operating means along the work, and means controlled by a contour of the work for relatively swinging the work and operating means in accordance with the curvature of said contour, substantially as described.

31. An automatic machine, having, in combination, a tool, feeding means acting to transfer the point of operation of the tool along the work in the direction of the periphery of the form, and automatic means controlled by the curvature of the form acting independently of the feeding movement to relatively swing the feeding means and form in conformity with said curvature, substantially as described.

32. An automatic machine, having, in combination, a form support, feeding means acting to cause a relative travel between the form and feeding means, a feeler arranged to engage the form, and mechanism controlled by the feeler for causing the relative travel between the feeding means and form to correspond to the contour of the form, substantially as described.

33. An automatic machine, having, in combination, a form support, feeding means acting to cause a relative travel between the feeding means and form, a feeler arranged to engage the form in advance of the point of operation of the feeding means, and mechanism controlled by the feeler acting to vary the relation of the form and feeding means in accordance with the curvature of the form, substantially as described.

34. An automatic machine, having, in combination, a form support, a gage, a feeding mechanism acting to transfer the gage along the form, and mechanism controlled by the contour of the form for relatively swinging the feeding mechanism and form in accordance with the curvature of the form to maintain the gage in engagement with the form, substantially as described.

35. An automatic machine, having, in combination, a gage, a support for a form, feeding means acting to transfer the gage along the periphery of the form, a feeler arranged to engage the periphery of the form, and mechanism controlled by the feeler acting automatically to keep the gage and form in contact, substantially as described.

36. A machine of the class described, having, in combination, a tool, means for relatively moving the tool and work to transfer the point of operation of the tool along the work, correcting mechanism for correcting the angular relation of the tool and work, and a form engaging feeler and connections through which the correcting mechanism is rendered active by a variation in the position of the feeler as its point of engagement is transferred along the form, substantially as described.

37. A machine of the class described, having, in combination, a tool and a work support relatively movable to transfer the point of operation of the tool along the work, correcting mechanism for correcting the angular relation of the tool and work, and a form engaging feeler and connections through which the correcting mechanism is rendered active by a variation in the position of the feeler as its point of engagement is transferred along the form, substantially as described.

38. A machine of the class described, having, in combination, a tool and a work support relatively movable to transfer the point of operation of the tool along the work, correcting mechanism for correcting the relative position of the tool and work, a plurality of form engaging devices and connections through which the correcting mechanism is rendered active by a variation in the relative position of the engaging devices as their points of engagement are transferred along a form, substantially as described.

39. A machine of the class described, having, in combination, a tool, means for relatively moving the tool and work to transfer the point of operation of the tool along the work, correcting mechanism for correcting the relative position of the tool and work, a plurality of form engaging devices and connections through which the correcting mechanism is rendered active by a variation in the relative position of the engaging devices as their points of engagement are transferred along a form, substantially as described.

40. A machine of the class described, having, in combination, a tool and a work support relatively movable to transfer the point of operation of the tool along the work, correcting mechanism for correcting the relative position of the tool and work, form engaging devices arranged one in advance of the other, and connections through which the correcting mechanism is rendered active by a variation in the relative position of the engaging devices as their points of engagement are transferred along a form, substantially as described.

41. A machine of the class described, having, in combination, a tool, means for relatively moving the tool and work to transfer the point of operation of the tool and work, correcting mechanism for correcting the relative position of the tool and work, a form engaging feeler arranged to engage and be controlled in its movement by the contour of the form, and connections through which the correcting mechanism is rendered active by variations in the position of the feeler as its point of engagement is transferred along the form, substantially as described.

42. In a machine of the class described, a work support, a tool constructed and arranged to operate upon a shoe sole, a feeler engaging a contour of the sole, and means controlled by the feeler to maintain the tool in predetermined angular relation to said contour, substantially as described.

43. A controlling mechanism for automatic machines, having, in combination, a power driven correcting mechanism, a form engaging feeler arranged to engage and be controlled in its movement by the contour of a form, and connections through which the correcting mechanism is rendered active by variations in the position of the feeler as its point of engagement is transferred along the form, substantially as described.

44. A machine of the class described, having, in combination, means for operating upon the work, a feeler acting along a contour of the work, and mechanism for correcting the angular relation of the operating means and work controlled by the feeler, substantially as described.

45. A machine of the class described, having, in combination, means for operating upon the work, mechanism for imparting relative movements to the work and operating means to maintain them in correct angular relation at the point of operation, a feeler acting along a contour of the work, and connections between the feeler and correcting means for determining the extent of the corrective movements, substantially as described.

46. A machine of the class described, having, in combination, means for operating upon the work, means for relatively moving the operating means and work to transfer the point of operation along the work, correcting mechanism for correcting the angular relation of the operating means and work, a feeler acting along a contour of the work, and connections through which the correcting mechanism is rendered active by a variation in the position of the feeler as its point of engagement is transferred along the work, substantially as described.

47. A machine of the class described, having, in combination, means for operating upon the work, means for relatively moving the work and operating means to transfer the point of operation along the work, correcting mechanism for correcting the relative position of the operating means and work, a plurality of work engaging devices arranged to act along a contour of the work, and connections through which the correcting mechanism is rendered active by a variation in the relative position of the work engaging devices as their points of engagement are transferred along the contour, substantially as described.

48. A machine of the class described, having, in combination, means for operating upon the work, feeding means for causing a relative travel of the operating means along the work in the direction of the periphery of a form, and mechanism controlled by the contour of the form for relatively swinging the feeding means and work about the point of operation to cause the path of travel of the tool along the work to correspond to the contour of the form, substantially as described.

49. An automatic machine, having, in combination, means for operating on the work, means for feeding the work to transfer the point of operation of the operating means along the work, and means controlled by a contour of the work for relatively moving the work and operating means in accordance with said contour, substantially as described.

50. An automatic shoe machine, having, in combination, means for operating on a shoe sole, means for feeding the sole, and mechanism controlled by the contour of the sole for swinging the sole to correct its position during the transfer of the point of operation about the sole, substantially as described.

51. An automatic sole machine, having, in combination, a work support, feeding means acting to press the marginal portion of a sole blank against the work support, a channeling tool for operating on the blank, and mechanism acting automatically, when the operation on the blank is completed, to separate the work support and the feeding means to release the blank, substantially as described.

52. An automatic sole machine, having, in combination, means for engaging, holding and feeding the marginal portion of a sole blank, means for operating thereon, and mechanism acting automatically, when the operation on the blank is completed, to cause the blank-holding means to release the blank to permit the discharge thereof, substantially as described.

53. An automatic sole machine, having, in combination, instrumentalities including means for holding, feeding and operating on a sole blank, a feeler engaging the blank, and automatic mechanism controlled by the feeler and acting, when the operation on the blank is completed, to operate the holding means to release the blank, substantially as described.

54. An automatic sole machine, having, in combination, a work support, a tool for operating on the marginal portion of a blank, feeding means acting to press the sole blank against the work support and feed the sole over the work support to present successive portions of its margin to the tool, and mechanism acting automatically when the operation on the blank is completed to separate the work support and the feeding means to release the blank, substantially as described.

55. An automatic sole machine, having, in combination, means for engaging and holding the marginal portion of a sole blank, means for operating thereon while the sole is engaged and held, and mechanism controlled by the blank acting automatically when the operation on the blank is completed to cause the blank holding means to release the blank to permit the discharge thereof, substantially as described.

56. A machine of the class described, having, in combination, an operating tool, means for guiding the relative movement of tool and work, and correcting means including a feeler constructed and arranged continuously to engage a pattern surface and means controlled thereby to maintain the tool in predetermined angular relation with the work.

57. A machine in which a tool is caused to operate progressively along the work comprising in combination means for producing relative movement of the tool and work, a plurality of devices engaging the work and arranged to be moved relatively thereby, and means constructed and arranged to be set in operation by the relative movement of said devices out of normal relation to each other to effect such relative movement of the tool and work that the normal relationship of said devices will be restored.

58. A machine in which a tool is caused to operate progressively along work, having, in combination, a work support and an operating tool relatively movable, mechanism including two guiding members constructed and arranged to determine the successive relative positions of work and tool, and means controlled automatically from a pattern surface for correcting or varying the effect of said mechanism by changing the position of at least one of said guiding members.

59. A machine in which a tool is caused to operate progressively along work, comprising a plurality of devices engaging the work along substantially the same line and constructed and arranged to be moved relatively to each other by the work, in combination with mechanism controlled by the relative movement of said devices to control the relation of work and tool.

60. A machine of the class described, comprising a tool for operating progressively along work, a plurality of devices engaging the work along a single predetermined path and constructed and arranged to be moved relatively to each other by the work, in combination with mechanism controlled by the relative movement of said devices to control the position of the work with relation to the tool.

61. A machine of the class described, comprising a tool for operating progressively along work, means for guiding the relative movement of work and tool, and means engaging a form at a plurality of separated points, at least one of which is at one side of the point of operation of the tool in the line of relative movement, for correcting or varying the effect of said guiding means.

62. A machine of the class described, comprising an operating tool and mechanism for maintaining the tool in a predetermined relation to the work during movement relatively thereto, said mechanism including a plurality of devices engaging a pattern surface and constructed and arranged to be moved with relation to each other by the changing contour of such surface thereby to effect a relative swinging movement of tool and work.

63. A machine in which a tool is caused to operate progressively along the work comprising a tool and means controlled by engagement with the work to swing the work automatically with relation to the tool to maintain at the point of operation a predetermined relative position of the work and tool, substantially as described.

64. A machine in which a tool is caused to operate progressively along the work comprising a tool and means controlled by engagement with the work to relatively swing the tool and work automatically to maintain at the point of operation a predetermined relative position of tool and work, substantially as described.

In testimony whereof I affix my signature, in presence of two witnesses.

ERASTUS E. WINKLEY.

Witnesses:
 FARNUM F. DORSEY,
 ALFRED H. HILDRETH.

---

Copies of this patent may be obtained for five cents each, by addressing the "Commissioner of Patents, Washington, D. C."